[11] 3,572,901

[72] Inventor Ikuo Mo
 Kawasaki
[21] Appl. No. 822,466
[22] Filed May 7, 1969
[45] Patented Mar. 30, 1971
[73] Assignee Nippon Kogaku K.K.
 Tokyo, Japan
[32] Priority June 5, 1968
[33] Japan
[31] 43/38012

[54] WIDE ANGLE OBJECTIVE LENS HAVING A FIELD ANGLE OF 108°
 2 Claims, 6 Drawing Figs.

[52] U.S. Cl. ............................................. 350/176, 350/214
[51] Int. Cl. ............................................. G02b 9/64
[50] Field of Search ................................. 350/214, 176, 177, 183, 215

[56] References Cited
 UNITED STATES PATENTS
 3,400,994 9/1968 Roosinov et al. ............... 350/215
 3,410,632 11/1968 Woltche ........................ 350/215

ABSTRACT: This invention relates to a retrofocus type extreme wide-angle objective lens having an angle of field of over 108° and comprising a front group dispersing lens system and a rear group convergent lens system on both sides of the diaphragm, wherein the lens system is formed by the front group dispersing system comprising a cemented positive meniscus lens $L_1$, negative meniscus lenses $L_2$ and $L_3$, and a cemented positive lens 4, and a negative meniscus lens $l_5$, and the rear group convergent system comprising a cemented positive lens $L_6$, a cemented negative lens $L_7$, and positive meniscus lenses $L_8$ and $L_9$ having the concave surface faced to the direction of incoming light respectively, and the above mentioned two groups are arranged on both sides of the diaphragm, and the aberrations are balanced and the sagittal image surface which tends to become positive in the marginal region of the picture is well corrected by widening the position of inflecting point of the meridional image surface by giving the following conditions:

$|R_{11}| < R_{12}$
 II $d_{13} > d_{12}$
 III $d_{14} + d_{15} > d_{16}$

Where $R$ is a radius of curvature and $d$ is the center thickness of a lens or lens spacing.

— SPHERICAL ABERRATION
---- COMA ABERRATION (50°)
—·— COMA ABERRATION (45°)

COMA ABERRATION

LOWER SIDE OF DIAPHRAGM    +0.4    UPPER SIDE OF DIAPHRAGM

−0.4

*INVENTOR.*

*BY*

FIG. 3
SPHERICAL ABERRATION
FIG. 4
ASTIGMATISM
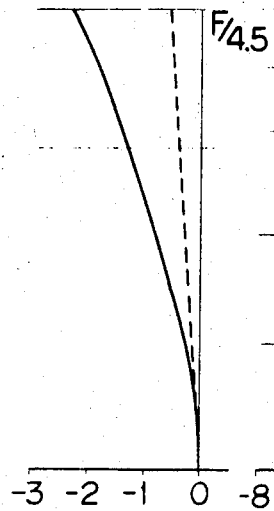
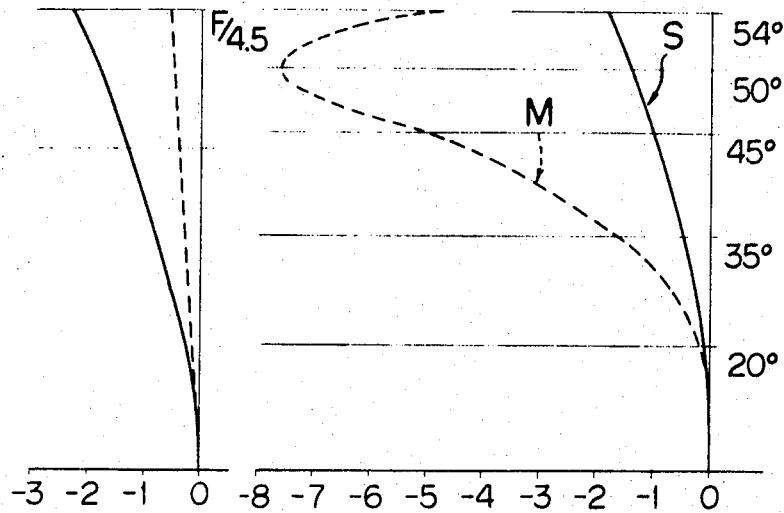
FIG. 5
DISTORTION
FIG. 6
ASTIGMATISM IN CAE OF MAGNIFICATION 1/40
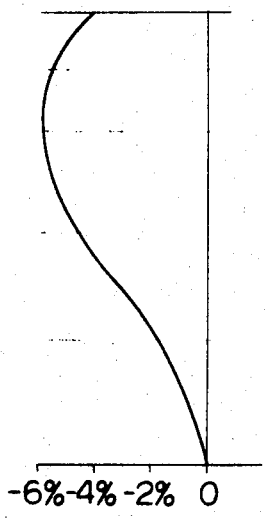
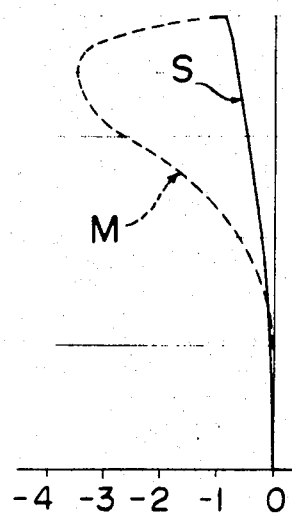

WIDE ANGLE OBJECTIVE LENS HAVING A FIELD ANGLE OF 108°

This invention relates to a retrofocus type extreme wide-angle objective lens having an angle of field of over 108° and comprising a front group divergent lens system and a rear group convergent lens system on both sides of the diaphragm.

In general, difficulties encountered in the design of an extremely wide retrofocus type lens having an angle of field of over 100° are that the sagittal image plane tends to become positive and that the meridional image plane suddenly inflects in positive direction starting at the angle of field of nearly 90°. Such a retrofocus type lens has a drawback that the meridional image plane shifts drastically to positive direction when the lens is focused at an object in near distance and the picture quality is greatly degraded near the edges of the picture. It is a common way to balance the aberration by shifting the meridional image plane to negative direction by a considerable amount. However, there is a limit in this amount itself.

An object of this invention is to solve the above-mentioned difficulties, remove the defects, and offer a retrofocus type extreme wide-angle lens having an angle of field of over 108° by bringing the above-mentioned meridional image plane as close to a position of angle of field of over 90° as possible.

According to this invention, it is possible to keep the diameter of a first lens relatively small without deteriorating the coma, to widen the angle of the point of inflection of the meridional image plane for balancing the aberrations, to well correct the sagittal image plane which tends to become positive at the margin of the picture, and to keep a back focus without affecting the distortion, for example, and it is possible to obtain a super-wide-angle lens for 35mm. single lens reflex camera having 16mm. in focal length, 108° in angle of field, F/4.5 in relative aperture, and about 2.3 times the focal length in back focus.

This invention dissolves the above-mentioned difficulties by forming a lens type with a front group dispersing system comprising a cemented positive meniscus lens $L_1$, negative meniscus lenses $L_2$ and $L_3$, a cemented positive lens $L_4$, and a negative meniscus lens $L_5$, and a rear group convergent system comprising a cemented positive lens $L_6$, a cemented negative lens $L_7$, positive meniscus lenses $L_8$ and $L_9$ having the concave surfaces faced toward the light-incoming direction respectively, and a diaphragm placed in between the above-mentioned two systems, and by giving the condition I through III described later. Furthermore, the lens $L_9$ can be a positive lens.

This invention will be described more clearly referring to the illustrative embodiment shown in the attached drawings, in which:

FIG. 3 is a curve showing the spherical aberration of the said example;

FIG. 4 is a curve showing the astigmatism of the said example;

FIG. 5 is a curve showing the distortion of the said example; and

FIG. 6 is a curve showing the distortion when the magnification is 1/40.

Figure 1:
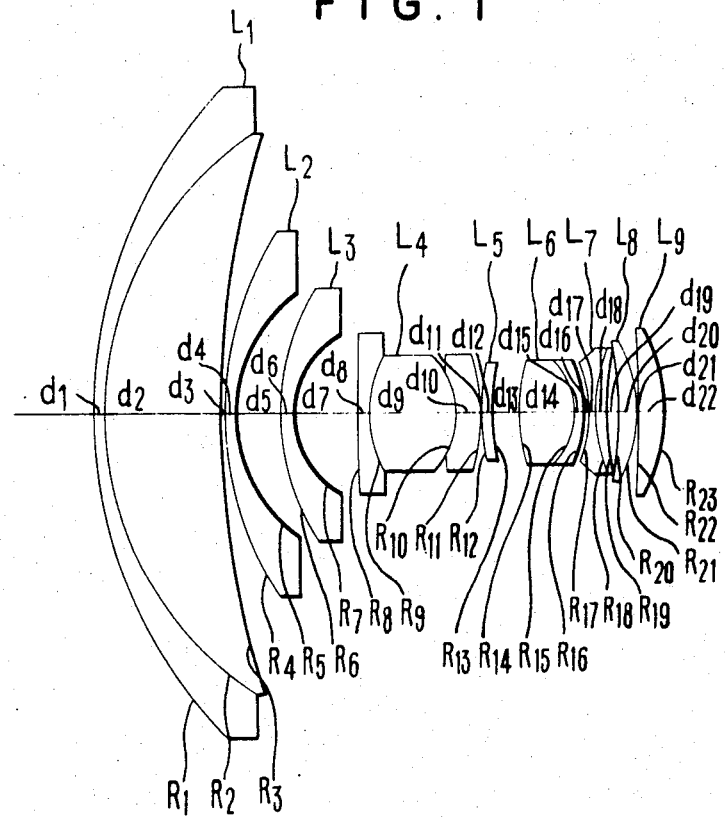
FIG. 1 is a cross-sectional view of the lens system of one example of this invention.

In FIG. 1, the front group dispersing system is formed by a cemented positive meniscus lens $L_1$, negative meniscus lenses $L_2$ and $L_3$, a cemented positive lens $L_4$, and a negative meniscus lens $L_5$, and the rear group convergent system is formed by a cemented positive lens $L_6$, a cemented negative lens $L_7$, positive meniscus lenses $L_8$ and $L_9$. The lens type, formed by arranging the above-mentioned front group dispersing system and the above-mentioned rear group convergent system before and behind the diaphragm, fulfills the following conditions:

I  $|R_{11}| < R_{12}$
II $d_{13} > d_{12}$
III $d_{14} + d_{15} > d_{16}$ where $R$ represents the radius of curvature, $d$ the central thickness of a lens or a spacing of a lens.

Although the positive lenses $L_1$ and $L_4$ are included in the section before the diaphragm of this lens system, it is possible to unify the lenses $L_1$, $L_2$, $L_3$, $L_4$, and $L_5$ and consider the unified group as the dispersing section of a retrofocus type lens. In conventional retrofocus type lenses, a considerably powerful converging lens is arranged next to its dispersing section. However, from the point of view that the lens $L_4$ of the present lens system is weak in convergency and that the dispersing function at the $R_9$ surface plays an important roll in the entire lens system, it is proper not to consider the lens $L_4$ as the converging lens characteristic of a retrofocus type lens. Therefore, from practical point of view, the front group is considered here to comprise a dispersing section, and the convergent section to be the group placed behind the diaphragm. Another merit of this lens system is that the diameter of the first lens $L_1$ is not required to be so large because there is no substantial convergent section arranged in front of the diaphragm.

However, this causes a remarkable negative coma to be produced at the lower section of an oblique light beam (the light beam passing through the lower side of the diaphragm). Generally speaking, in a retrofocus type lens having convergent section before the diaphragm, the curved surfaces among the convergent section concave to the object side play the part of correcting the coma. In this lens system, however, the above-mentioned condition I plays this part. When the condition I is not fulfilled the negative coma is increased, and a satisfactory image quality cannot be obtained at all. The condition II is required for purpose of extending the back focus. Especially, since the lens distance $d_{13}$ denotes the position where an oblique light beam crosses the optical axis, it has an advantage that the distortion is not affected very much when the back focus is secured by this distance. When the condition II is not fulfilled, it is impossible to obtain a back focus such as the one shown in an example described later. The condition III offers means for correcting the curvature of meridional image plane, which is the main object of this invention. When the center thickness of $L_6$, i.e. $d_{14}+d_{15}$, is increased as indicated in the condition III, the meridional image surface shifts in positive direction and the shifting amount at the intermediate section is larger the shifting amount at the extreme of the marginal region of the picture compared with other surfaces. This property is used to widen the angle of the position of the inflection of the above-mentioned meridional image surface. Simultaneously, the sagittal image surface which tends to become positive at the marginal region of the picture is favorably corrected by giving a very small value to the lens distance $d_{16}$. If this condition is not fulfilled picture quality is greatly deteriorated at the marginal region of the picture due to the degradation of astigmatism.

FIG. 1 shows an example of super-wide-angle objective lens of this invention. The specification of this lens system is as follows when the relative aperture is F/4.5, the angle of field is 108°, and the focal distance is $f=100$.

| | | | |
|---|---|---|---|
| $R_1=243.90$ | $d_1=7.32$ | $n_1=1.7847$ | $\nu_{d1}=26.1$ |
| $R_2=176.83$ | $d_2=63.40$ | $n_2=1.6968$ | $\nu_{d2}=55.6$ |
| $R_3=539.63$ | $d_3=0.61$ | | |
| $R_4=181.70$ | $d_4=4.88$ | $n_3=1.6968$ | $\nu_{d3}=55.6$ |
| $R_5=76.22$ | $d_5=24.39$ | | |
| $R_6=128.05$ | $d_6=6.1$ | $n_4=1.6968$ | $\nu_{d4}=55.6$ |
| $R_7=48.78$ | $d_7=34.15$ | | |
| $R_8=914.63$ | $d_8=6.1$ | $n_5=1.80454$ | $\nu_{d5}=39.5$ |
| $R_9=59.15$ | $d_9=46.95$ | $n_6=1.58065$ | $\nu_{d6}=37.1$ |
| $R_{10}=-40.85$ | $d_{10}=12.20$ | $n_7=1.58913$ | $\nu_{d7}=61.2$ |
| $R_{11}=-137.20$ | $d_{11}=0.61$ | | |
| $R_{12}=182.93$ | $d_{12}=4.27$ | $n_8=1.6968$ | $\nu_{d8}=55.6$ |
| $R_{13}=121.95$ | $d_{13}=15.24$ | | |

| | | | |
|---|---|---|---|
| $R_{14}=121.95$ | $d_{14}=28.66$ | $n_9=1.62588$ | $\nu_{d9}=35.6$ |
| $R_{15}=-39.63$ | $d_{15}=6.10$ | $n_{10}=1.6228$ | $\nu_{d10}=56.9$ |
| $R_{16}=-71.95$ | $d_{16}=2.44$ | | |
| $R_{17}=-68.90$ | $d_{17}=3.66$ | $n_{11}=1.80518$ | $\nu_{d11}=25.5$ |
| $R_{18}=98.78$ | $d_{18}=6.10$ | $n_{12}=1.62041$ | $\nu_{d12}=60.3$ |
| $R_{19}=280.18$ | $d_{19}=3.66$ | | |
| $R_{20}=-283.54$ | $d_{20}=10.06$ | $n_{13}=1.51728$ | $\nu_{d13}=69.6$ |
| $R_{21}=-76.83$ | $d_{21}=0.61$ | | |
| $R_{22}=-1371.95$ | $d_{22}=14.02$ | $n_{14}=1.51728$ | $\nu_{d14}=69.6$ |
| $R_{23}=-86.22$ | | | |

Figure 2:
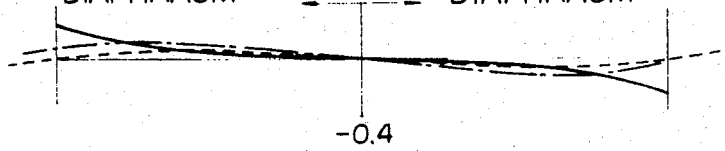
FIG. 2 is a curve showing the coma of the said example.

B. $f=231.10$.

where
R: radius of curvature
d: thickness of lens and lens spacing
N: refractive index of the glass used
VD: Abbe's number of the glass used FIG. 2 shows the coma, FIG. 3 the spherical aberration, FIG. 4 the astigmatism, FIG. 5 the distortion, and FIG. 6 the astigmatism in case the magnification is 1/40. The Seidel aberration coefficients of each refracting surface are as shown in the table below.

In this table, I denotes the spherical aberration, II the coma, III the inflection of the meridional image, IV the inflection of the sagittal image, and V the distortion.

| | I | II | III | IV | V |
|---|---|---|---|---|---|
| $J_1$ | 0.017 | 0.019 | 0.244 | 0.201 | 0.225 |
| $J_2$ | −0.003 | −0.001 | −0.017 | −0.017 | −0.004 |
| $J_3$ | 0.000 | −0.001 | 0.138 | −0.005 | −0.952 |
| $J_4$ | 0.001 | 0.003 | 0.253 | 0.235 | 0.613 |
| $J_5$ | −0.847 | 0.006 | −0.539 | −0.539 | 0.004 |
| $J_6$ | 0.375 | 0.194 | 0.622 | 0.421 | 0.218 |
| $J_7$ | −10.285 | 1.189 | −1.255 | −0.979 | 0.113 |
| $J_8$ | 1.707 | 0.700 | 0.910 | 0.336 | 0.138 |
| $J_9$ | −10.580 | 0.288 | −0.156 | −0.141 | 0.004 |
| $J_{10}$ | −0.447 | 0.067 | 0.039 | −0.019 | 0.003 |
| $J_{11}$ | −0.098 | 0.078 | 0.080 | 0.207 | −0.167 |
| $J_{12}$ | 4.452 | 1.184 | 1.170 | 0.540 | 0.143 |
| $J_{13}$ | −15.070 | −2.644 | −1.729 | −0.801 | −0.141 |
| $J_{14}$ | 17.935 | 3.391 | 2.240 | 0.957 | 0.181 |
| $J_{15}$ | 0.947 | 0.003 | 0.003 | 0.003 | 0.000 |
| $J_{16}$ | 84.521 | −2.823 | 0.816 | 0.628 | −0.021 |
| $J_{17}$ | −93.420 | 2.663 | −0.875 | −0.723 | 0.021 |
| $J_{18}$ | −7.465 | −1.414 | −0.867 | −0.332 | −0.063 |
| $J_{19}$ | −10.742 | −3.271 | −3.124 | −1.133 | −0.345 |
| $J_{20}$ | 0.641 | 0.498 | 1.043 | 0.268 | 0.208 |
| $J_{21}$ | 7.952 | −0.453 | 0.521 | 0.469 | −0.027 |
| $J_{22}$ | 0.005 | 0.018 | 0.162 | 0.036 | 0.126 |
| $J_{23}$ | 36.574 | 0.355 | 0.406 | 0.399 | 0.004 |
| $\Sigma$ | 6.170 | 0.049 | 0.007 | 0.011 | 0.281 |

I claim:

1. A retrofocus type extreme wide-angle lens comprising a front group dispersing system comprising a positive component $L_1$ formed with a negative meniscus lens and a positive meniscus lens cemented together, the cemented surface of said component $L_1$ being convex toward the object, negative meniscus components $L_2$ and $L_3$ having surfaces convex towards the object respectively, a positive component $L_4$ formed with two negative meniscus lenses cemented with a biconvex lens between them, and a negative meniscus component $L_5$ having surfaces convex towards the object; a rear group converging system comprising a positive component $L_6$ formed with a biconvex lens and a negative meniscus lens cemented together, a component $L_7$ formed with a biconcave lens and a positive meniscus lens, and positive meniscus components $L_8$ and $L_9$, having surfaces concave towards the image respectively; and a diaphragm place in between said systems, the following conditions being met I   $|R_{11}|<R_{12}$
II  $d_{13}>d_{12}$
III $d_14+d_15 >d_{16}$ where $R_{11}$ denotes the radius of curvature of rear surface of component $L_4$, $R_{12}$ denotes the radius of curvature of front surface of component $L_5$, $d_{12}$ denotes the thickness of component $L_5$, $d_{13}$ denotes the air space between components $L_5$ and $L_6$, $d_{14}+d_{15}$ denotes the thickness of components $L_6$, $d_{16}$ denotes the air space between components $L_6$ and $L_7$.

2. A retrofocus-type extreme wide-angle lens according to claim 1, in which the lenses have the following numerical values:

| | | | |
|---|---|---|---|
| $R_1=243.90$ | $d_1=7.32$ | $n_1=1.7847$ | $\nu_{d1}=26.1$ |
| $R_2=176.83$ | $d_2=63.40$ | $n_2=1.6968$ | $\nu_{d2}=55.6$ |
| $R_3=539.63$ | $d_3=0.61$ | | |
| $R_4=181.70$ | $d_4=4.88$ | $n_3=1.6968$ | $\nu_{d3}=55.6$ |
| $R_5=76.22$ | $d_5=24.39$ | | |
| $R_6=128.05$ | $d_6=6.1$ | $n_4=1.6968$ | $\nu_{d4}=55.6$ |
| $R_7=48.78$ | $d_7=34.15$ | | |
| $R_8=914.63$ | $d_8=6.1$ | $n_5=1.80454$ | $\nu_{d5}=39.5$ |
| $R_9=59.15$ | $d_9=46.95$ | $n_6=1.58065$ | $\nu_{d6}=37.1$ |
| $R_{10}=-40.85$ | $d_{10}=12.20$ | $n_7=1.58913$ | $\nu_{d7}=61.2$ |
| $R_{11}=-137.20$ | $d_{11}=0.61$ | | |
| $R_{12}=182.93$ | $d_{12}=4.27$ | $n_8=1.6968$ | $\nu_{d8}=55.6$ |
| $R_{13}=121.95$ | $d_{13}=15.24$ | | |
| $R_{14}=121.95$ | $d_{14}=28.66$ | $n_9=1.62588$ | $\nu_{d9}=35.6$ |
| $R_{15}=-39.63$ | $d_{15}=6.10$ | $n_{10}=1.6228$ | $\nu_{d10}=56.9$ |
| $R_{16}=-71.95$ | $d_{16}=2.44$ | | |
| $R_{17}=-68.90$ | $d_{17}=3.66$ | $n_{11}=1.80518$ | $\nu_{d11}=25.5$ |
| $R_{18}=98.78$ | $d_{18}=6.10$ | $n_{12}=1.62041$ | $\nu_{d12}=60.3$ |
| $R_{19}=280.18$ | $d_{19}=3.66$ | | |
| $R_{20}=-283.54$ | $d_{20}=10.06$ | $n_{13}=1.51728$ | $\nu_{d13}=69.6$ |
| $R_{21}=-76.83$ | $d_{21}=0.61$ | | |
| $R_{22}=-1371.95$ | $d_{22}=14.02$ | $n_{14}=1.51728$ | $\nu_{d14}=69.6$ |
| $R_{23}=-86.22$ | | | |

B. $f=231.10$.